C. BROWN.
BALING SHORT CUT HAY.
No. 169,518.  Patented Nov. 2, 1875.
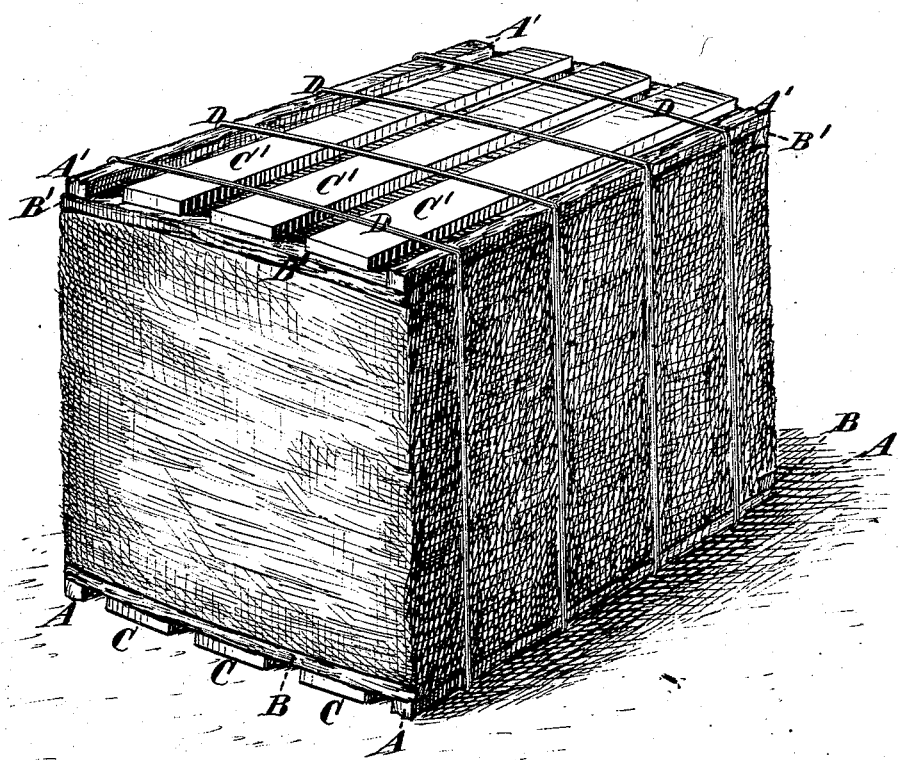

UNITED STATES PATENT OFFICE.

CHARLES BROWN, OF NEW YORK, N. Y.

IMPROVEMENT IN BALING SHORT-CUT HAY.

Specification forming part of Letters Patent No. 169,518, dated November 2, 1875; application filed September 28, 1875.

*To all whom it may concern:*

Be it known that I, CHARLES BROWN, of the city, county, and State of New York, have invented a new and useful Improvement in Baling Short-Cut Hay and Straw, with or without feed; and I do hereby declare that the following is a full, clear, and exact description of the same, reference being had to the accompanying drawing, which forms part of this specification.

Long hay is usually baled on or convenient to the place upon which it is produced, and the same afterward sent to market for future use, either by working it up into short-cut hay, or otherwise.

In baling long hay it is customary to use four or six heavy sticks arranged lengthwise upon the exterior of the bale, and these sticks, after the bale has been broken or used, have had but little if any value.

One of the objects of my invention is to use these sticks in the baling of short-cut hay or straw, with or without feed; and although place is immaterial, this can, generally, be done most economically in the market towns or cities where the long hay has been sold.

In baling short-cut hay or straw, with or without feed, however, a different and much closer arrangement of the binders is necessary; and my invention consists in a novel combination of cross-edge and longitudinal-edge sticks and separated slats applied to opposite sides of the bale, the whole being bound together, with the compacted contents of the bale, by bands, cords, ropes, or wires, substantially as hereinafter described, and whereby I am not only enabled to use the sticks previously employed in baling long hay or other rough sticks, but am able to bale the short-cut hay or straw, with or without feed, in a most economical, complete, and solid manner, and so that the contents of the bale are protected alike from heating and from injury by exposure to the weather.

The drawing represents a view in perspective of a bale of short-cut hay or straw, with or without feed, put up in accordance with my invention.

A A and B B are four sticks, which may have been previously used in baling long hay; or they may be specially made for baling short-cut hay or straw, with or without feed. These sticks A A and B B are placed in the cut-hay press before the loose and uncompacted short-cut hay or straw, with or without feed, is filled into the press, and so that the binders A A will underlap at their ends the binders B B, thus binding four of the edges of the bale. After this, the loose and uncompacted short-cut hay or straw, with or without feed, is put into the press, and four more sticks, A' A' B' B', are placed in a corresponding relation with the other sticks A A B B, on or along the four edges of the upper or opposite side of the loose or uncompacted mass, or uncompressed contents of the bale. There are also placed between the longitudinal or side-edge sticks A A and A' A', on the upper and lower or opposite sides of said loose mass or unpressed contents of the bale, two or more thin wood slats, C C and C' C', separated from each other, respectively, and with their ends also resting on or lying over the cross-sticks B B B' B'. These slats may be arranged at a distance of two or three inches apart, more or less. Pressure is then applied to the mass thus bound and protected, and when sufficiently compacted, bands, cords, ropes, or wires D D are passed and fastened around the compressed mass of short-cut hay or straw, with or without feed, and around the sticks or binders A A' and slats C C', to retain the bale in its compacted form.

By the combination of the cross-edge sticks B B' with the longitudinal-edge sticks A A' the bale is bound on eight of its edges by the sticks, thus preventing the spreading of both the sides and ends of the bale, and preventing the contents of the bale from becoming loosened and wasted during handling or transportation of the bale. This retaining of the compactness of the bale at its sides and ends resists the effects of dampness and wet.

By the combination of the separated slats C C' with the sticks A A' and B B', not only is the bale more firmly braced or held together, but any wet or dampness which the bale has contracted by long or severe exposure to the weather will escape by evaporation on suitably exposing the bale to the air or sun, whereas a close covering on the same sides of the bale causes the wet or dampness to be retained in the bale, so that the contents of the latter are seriously injured or made worthless by heating and rotting.

I claim—

The combination of the longitudinal and separated slats C C' with the cross-edge sticks B B B' B', the longitudinal edge sticks A A A' A', applied to opposite sides of the bale, and the binding bands, cords, ropes, or wires D, substantially as shown and described, and for the purposes herein set forth.

CHARLES BROWN.

Witnesses:
MICHAEL RYAN.
HENRY T. BROWN.